United States Patent
Buggins et al.

(10) Patent No.: US 12,093,867 B2
(45) Date of Patent: Sep. 17, 2024

(54) INCIDENT MANAGEMENT IN INFORMATION TECHNOLOGY SYSTEMS

(71) Applicant: International Business Machines Corporation, Armonk, NY (US)

(72) Inventors: Jack Richard Buggins, London (GB); Caelum Jayd Forder, Cork City (IE); Mandeep Chana, Wokingham (GB); Viraj Jayeshkumar Vyas, Manchester (GB)

(73) Assignee: International Business Machines Corporation, Armonk, NY (US)

(*) Notice: Subject to any disclaimer, the term of this patent is extended or adjusted under 35 U.S.C. 154(b) by 193 days.

(21) Appl. No.: 17/358,047

(22) Filed: Jun. 25, 2021

(65) Prior Publication Data
US 2022/0414571 A1    Dec. 29, 2022

(51) Int. Cl.
G06Q 10/0631 (2023.01)
G06F 16/2458 (2019.01)
G06F 16/28 (2019.01)

(52) U.S. Cl.
CPC ... G06Q 10/06316 (2013.01); G06F 16/2465 (2019.01); G06F 16/285 (2019.01); *G06F 2216/03* (2013.01)

(58) Field of Classification Search
CPC ............. G06F 2216/03; G06F 16/2465; G06F 16/285; G06F 11/00; G05B 19/418
See application file for complete search history.

(56) References Cited

U.S. PATENT DOCUMENTS

| | | | |
|---|---|---|---|
| 8,639,795 B2 | 1/2014 | Betge-Brezetz et al. | |
| 9,104,753 B2 | 8/2015 | Stuempfle et al. | |
| 9,250,993 B2 | 1/2016 | Mani et al. | |
| 9,787,598 B2 | 10/2017 | Bertram et al. | |
| 10,439,884 B1* | 10/2019 | Forte | H04L 63/20 |
| 10,671,263 B2 | 6/2020 | King et al. | |
| 10,783,453 B2 | 9/2020 | El Sayyed et al. | |
| 10,917,520 B1* | 2/2021 | T. G | H04M 3/5233 |
| 2014/0280068 A1* | 9/2014 | Dhoopar | G06Q 10/06 707/722 |
| 2015/0120753 A1 | 4/2015 | Wang et al. | |
| 2016/0100000 A1* | 4/2016 | Dey | H04L 67/104 709/205 |
| 2017/0140315 A1* | 5/2017 | Cao | G06Q 10/06311 |

(Continued)

OTHER PUBLICATIONS

Anonymous, "Incident Management", IT Process Wiki, downloaded from the Internet on Dec. 13, 2022, 9 pages.

(Continued)

*Primary Examiner* — Deirdre D Hatcher
(74) *Attorney, Agent, or Firm* — Shackelford, McKinley & Norton, LLP

(57) ABSTRACT

An operations management system and related method obtains user activity information representing user interactions with the operations management system responsive to an incident, the incident belonging to a category of incidents. The method represents the user activity information as an itemset. The method further processes the itemset with a mining algorithm to identify one or more items of information frequently accessed for the incident. The method yet further associates the identified one or more items of information with the category of incidents.

15 Claims, 8 Drawing Sheets

(56) References Cited

U.S. PATENT DOCUMENTS

| | | | |
|---|---|---|---|
| 2018/0088564 A1* | 3/2018 | Billi-Duran | G05B 19/41865 |
| 2018/0285750 A1* | 10/2018 | Purushothaman | G06N 5/045 |
| 2020/0021482 A1* | 1/2020 | Lo | H04L 41/22 |
| 2020/0110647 A1* | 4/2020 | Souche | G06F 11/0709 |
| 2020/0210322 A1* | 7/2020 | Sen | G06F 11/3636 |
| 2020/0364290 A1* | 11/2020 | Bose | H04L 67/535 |
| 2021/0035333 A1* | 2/2021 | Wright | G06V 20/20 |
| 2021/0263792 A1* | 8/2021 | Vah | G06N 3/044 |
| 2022/0276882 A1* | 9/2022 | Bradfield | G06N 20/00 |

OTHER PUBLICATIONS

Mell, P. et al., "The NIST Definition of Cloud Computing", Recommendations of the National Institute of Standards and Technology, NIST Special Publication 800-145, 7 pages, Sep. 2011.

* cited by examiner

INCIDENT MANAGEMENT IN INFORMATION TECHNOLOGY SYSTEMS

BACKGROUND

The technical character of the present disclosure generally relates to the field of information technology (IT) systems, and more particularly, to systems and methods for incident management in IT systems.

In operations management and IT service management systems, there exist multiple paradigms for managing incidents. A widely known paradigm is incident management. Incident management aims to manage the lifecycle of incidents (i.e., service interruptions, unplanned interruptions, or reductions in quality of IT services). A primary objective of an incident management process is to return an IT service to users as quickly as possible.

Operation management systems, which typically include incident management systems along with other systems, usually include network and systems topology tools. They also include incident management capabilities, which enable operators to interact directly with certain incidents (as opposed to executing pre-processed/pre-arranged incidents responsive to incidents), e.g., via a user interface. Additionally, operations management systems typically include tools for gathering information and/or metrics about resources of a service and/or system. Yet further, operations management systems may provide automated scripts and runbook tools for assisting a user to investigate or resolve an incident.

Although having a multitude of information sources, information, and tools can be useful for incident management, this may not help in meeting the primary objective of returning an IT service as quickly as possible. For instance, a large amount of information being made available to an operator can present a problem (e.g., the operator must search all of the information), which detracts from the time the operator is able to spend addressing the actual issues.

SUMMARY

The present disclosure provides a method for an operations management system. Such a method may be computer-implemented. That is, such a method may be implemented in a computer infrastructure having computer executable code tangibly embodied on a computer readable storage medium having programming instructions configured to a perform a proposed method. The present disclosure further seeks to provide a computer program product including computer program code for implementing the proposed concepts when executed on a processor. The present disclosure yet further seeks to provide an incident management system for an operations management system.

According to an aspect of the present disclosure there is provided a computer-implemented method for an operations management system. The method comprises obtaining user activity information representing user interactions with the operations management system responsive to an incident, the incident belonging to a category of incidents. The method also comprises representing the user activity information as an itemset. The method further comprises processing the itemset with a mining algorithm to identify one or more items of information frequently accessed for the incident. The method yet further comprises associating the identified one or more items of information with the category of incidents.

Embodiments may be employed in combination with conventional/existing operations management systems and/or incident management systems. In this way, embodiments may integrate into legacy systems to improve and/or extend their functionality and capabilities. An improved operations management system may therefore be provided by proposed embodiments.

According to another embodiment of the present disclosure, there is provided a computer program product for an operations management system, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to another aspect, there is provided an incident management system for an operations management system. The system comprises a processor arrangement configured to perform the operations of: obtaining user activity information representing user interactions with the operations management system responsive to an incident, the incident belonging to a category of incidents; representing the user activity information as an itemset; processing the itemset with a mining algorithm to identify one or more items of information frequently accessed for the incident; and associating the identified one or more items of information with the category of incidents.

Thus, a concept is disclosed for supplying enriched and relevant information for an incident which employs frequent itemset mining of user interactions with an operations management system. For instance, such a concept may monitor and/or analyze user activity in relation to an incident and then subject the user activity to frequent itemset mining techniques to identify information to use as an enrichment for a subsequent occurrence of the incident.

BRIEF DESCRIPTION OF THE DRAWINGS

The present disclosure is described in the detailed description which follows, in reference to the noted plurality of drawings by way of non-limiting examples of example embodiments of the present disclosure.

DETAILED DESCRIPTION

Figure 1:
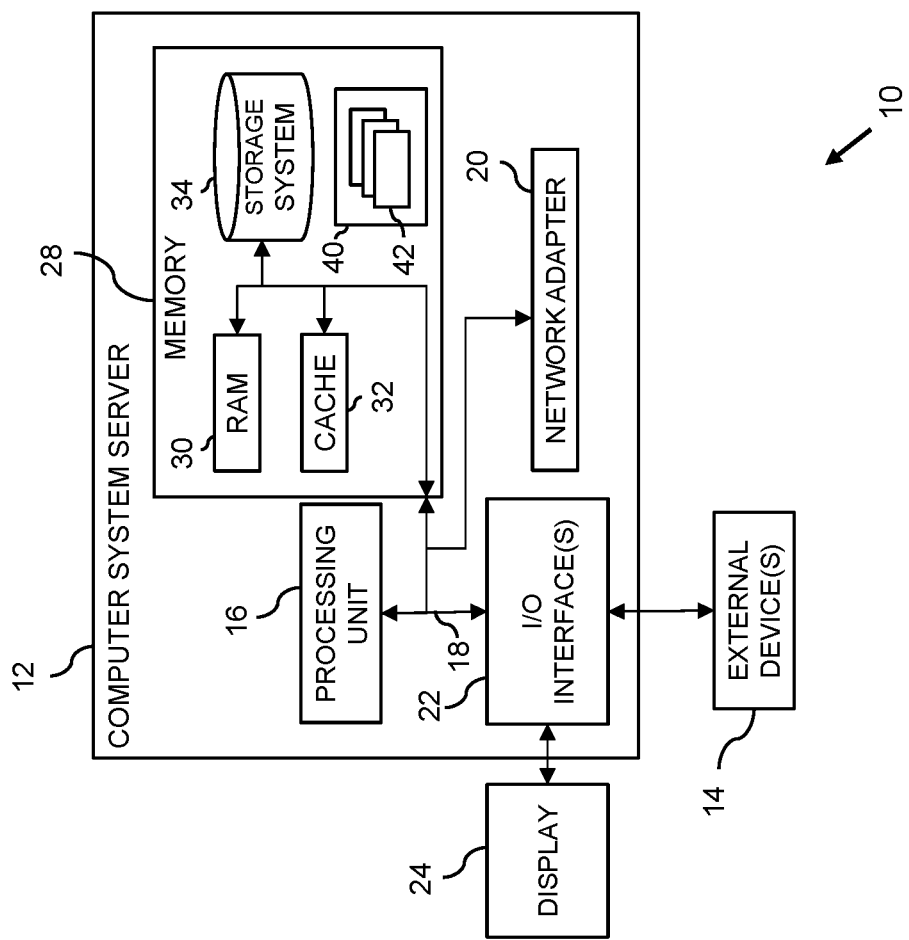
FIG. 1 depicts a cloud computing node according to some embodiments of the present disclosure.

The Figures are merely schematic and are not drawn to scale. The same reference numerals are used throughout the Figures to indicate the same or similar parts.

In the context of the present application, where embodiments of the present disclosure constitute a method, such a method is a process for execution by a computer, i.e., is a computer-implementable method. The various operations of the method therefore reflect various parts of a computer program, e.g., various parts of one or more algorithms.

Also, in the context of the present application, a (processing) system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet, and so on, to cooperatively execute at least one embodiment of the methods of the present disclosure.

Also, in the context of the present application, a system may be a single device or a collection of distributed devices that are adapted to execute one or more embodiments of the methods of the present disclosure. For instance, a system may be a personal computer (PC), a portable computing device (such as a tablet computer, laptop, smartphone, etc.), a set-top box, a server, or a collection of PCs and/or servers connected via a network such as a local area network, the Internet, and so on, to cooperatively execute at least one embodiment of the methods of the present disclosure.

The technical character of the present disclosure generally relates to operations management, and more particularly, to incident management concepts that may, for example, supply enriched and relevant information for an incident. More specifically, embodiments of the present disclosure provide a concept for automatically providing relevant materials/information, based on user actions during an incident lifecycle. This information/material may be supplied (e.g., concatenated, appended, added, etc.) directly into incidents so that operators do not need to search for such resources. Embodiments may also be able to adapt to changing resource requirements for future instances of the same incident.

Embodiments may employ concepts that automatically determine user interest in items of information during incident investigation. This may, for example, be achieved by obtaining information regarding the user's interaction with an operations management system and then processing the obtained information using frequent itemset mining techniques. Through the identification of items of information that are frequently used, such items of information may be used to enrich information that is provided to a user the next time the incident (or a similar incident) occurs.

Embodiments may therefore obviate or mitigate problems associated with conventional incident management approaches, by providing a method, a system and a computer program product for incident management by supplying enriched and relevant information for an incident.

The proposed concept(s) may achieve such benefits through the use of frequent itemset mining based on user interactions with the operations management system(s). Itemsets that meet a minimum support threshold are referred to as frequent itemsets. Incidents pertaining to a particular incident group/type/category (e.g., having a certain signature) may be actively assigned to one or more members of the operations team.

In particular, embodiments may monitor and/or analyze two main types of user activity: (A) User activity of browsing and exploring tools such as log data, topology data, metrics data, and runbook entries pertaining to an incident; and (B) User dismissal of log data, topology data, metrics data and runbook entries whilst using an incident management system (which may include enrichment data provided by proposed embodiments).

The user activity from activity type (A) may be subjected to frequent itemset mining techniques (e.g., from the preceding N occurrences of an incident). Numerous itemset mining technique/algorithms exist and are well-known. This may identify items (e.g., independent management tools and/or data) of information to use as an enrichment (e.g., augmentation, supplement, addition, etc.) for the next occurrence of the incident (or a similar incident). Such mining may take place after the incident (e.g., once the incident has closed). Enrichments that are detected as being common (i.e., frequent in occurrence), via frequent itemset mining, may be stored and concatenated to the total list of enrichments to apply in response to an occurrence. In this way, once identified as an enrichment for an incident, they will always be provided as an enrichment responsive to another occurrence of the incident (regardless of whether they are identified via frequent itemset mining for a subsequent occurrence of the incident).

Conversely, for frequent itemset mining that executes on dismissals of enriched information with respect to an incident, subtraction from a set of enrichments for that incident may be performed. In this way, data/items that are repeatedly/frequently dismissed may be removed from the information used as an enrichment (e.g., list of enrichments) for the incident. It may also account for differing interactions by multiple users. Multiple users may therefore operate on an incident through one or more occurrences independently, and embodiments may automatically analyze a collective set of the user interaction via an itemset for a given signature.

Data items may, however, be subsequently re-populated (i.e., re-added) into information used as an enrichment for the incident by being identified by frequent itemset mining based on user activities. This facet of the proposed concept(s) provides users of the system who are assigned to an incident a mechanism to dismiss information that may no longer be valid, useful, or relevant (e.g., via eye tracking (gaze detection), interactivity (or lack thereof), clicking of a dismissal button, etc.). Further, after multiple or repeated instances of dismissal across incident occurrences, the dismissal action may be represented as a frequent item and used for set subtraction over plural items to enrich. This may help to ensure that only information deemed relevant is presented to a user in response to an incident.

Incidents of the same or similar nature/type may be categorized (e.g., grouped), such that observations of user interaction with an operations management system can be tracked against multiple instances of an incident of the same category. This may be thought of as being an incident signature, where the signature is indicative or representative of the category of the incident.

For each incident occurrence, a new set of user interactions may be collected for identifying both enrichments and dismissals.

Thus, by analyzing a user's activity responsive to an incident and creating one or more data enrichments for the incident, the data enrichment(s) may be automatically supplied to the user in response a subsequent occurrence of the incident (or incident of the same or similar type/category/nature). In this way, useful and relevant information may be determined based on user activity, and such information may be automatically provided to a user, thus alleviating a need for the user to otherwise undertake time consuming and/or complex incident response activities (such as searching or retrieving diagnostic information). In particular, embodiments may provide a method/system for providing enriched incident response/management data by monitoring a user's activity in response to one or more incidents. Such user activity may be represented using a frequent itemset that can be analyzed (e.g., mined) to identify and generate data enrichments. Similarly, embodiments may implement incident management concepts in a computer program product through the utilization of information relating to a user's activity in response to one or more incidents.

Also, by analyzing a user's activity responsive to an incident and defining one or more data dismissals for the incident, the data dismissal(s) may be automatically prevented from being supplied to the user in response a subsequent occurrence of the incident (or incident of the same or similar type/category/nature). In this way, undesired and/or irrelevant information may be determined based on user activity, and such information may be automatically withheld from a user, thus alleviating a need for the user to otherwise undertake time consuming and/or complex incident response activities (such as dismissing diagnostic information). In particular, embodiments may provide a method/system for providing filtered enrichment data by monitoring a user's activity in response to one or more incidents.

A disclosed embodiment provides a computer-implemented method for an operations management system. The method comprises: obtaining user activity information representing user interactions with the operations management system responsive to an incident, the incident belonging to a category of incidents, representing the user activity information as an itemset (i.e., set, collection or group of items), processing the itemset with a (data) mining algorithm to identify one or more items of information frequently accessed for the incident, and associating the identified one or more items of information with the category of incidents Although this disclosure includes a detailed description on cloud computing, implementation of the techniques recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
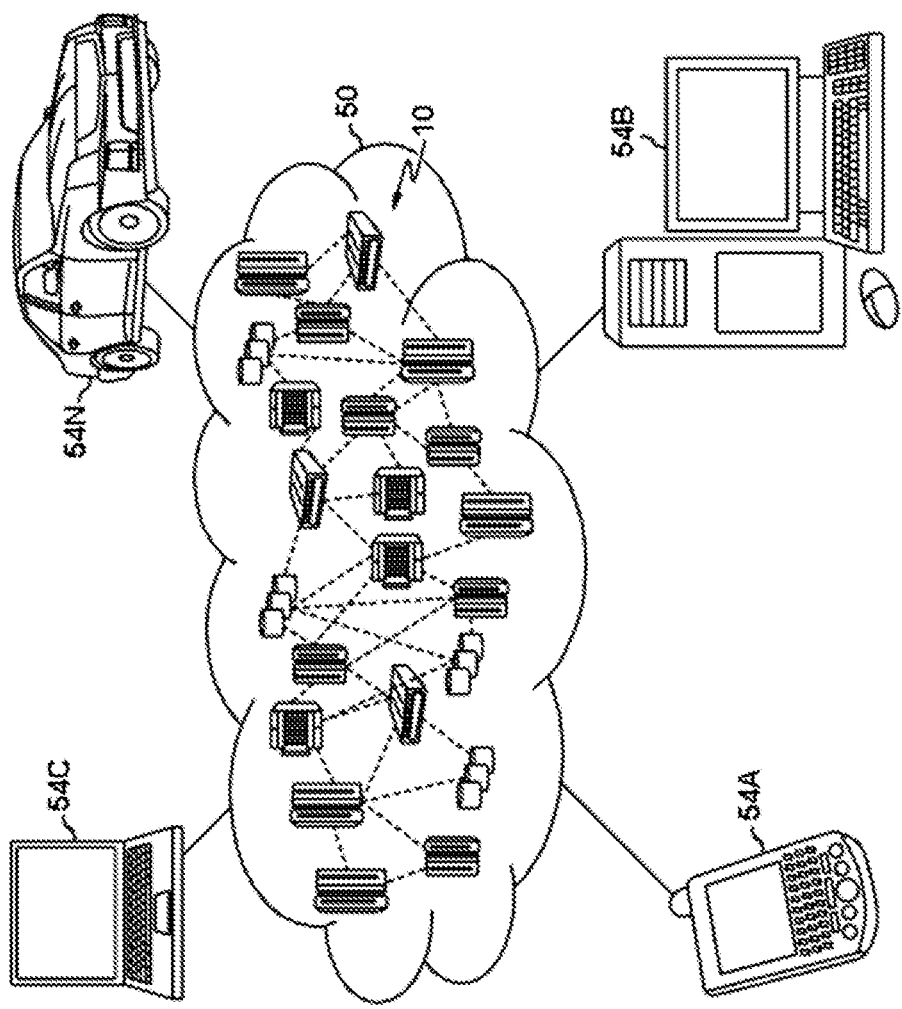
FIG. 2 depicts a cloud computing environment according to some embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
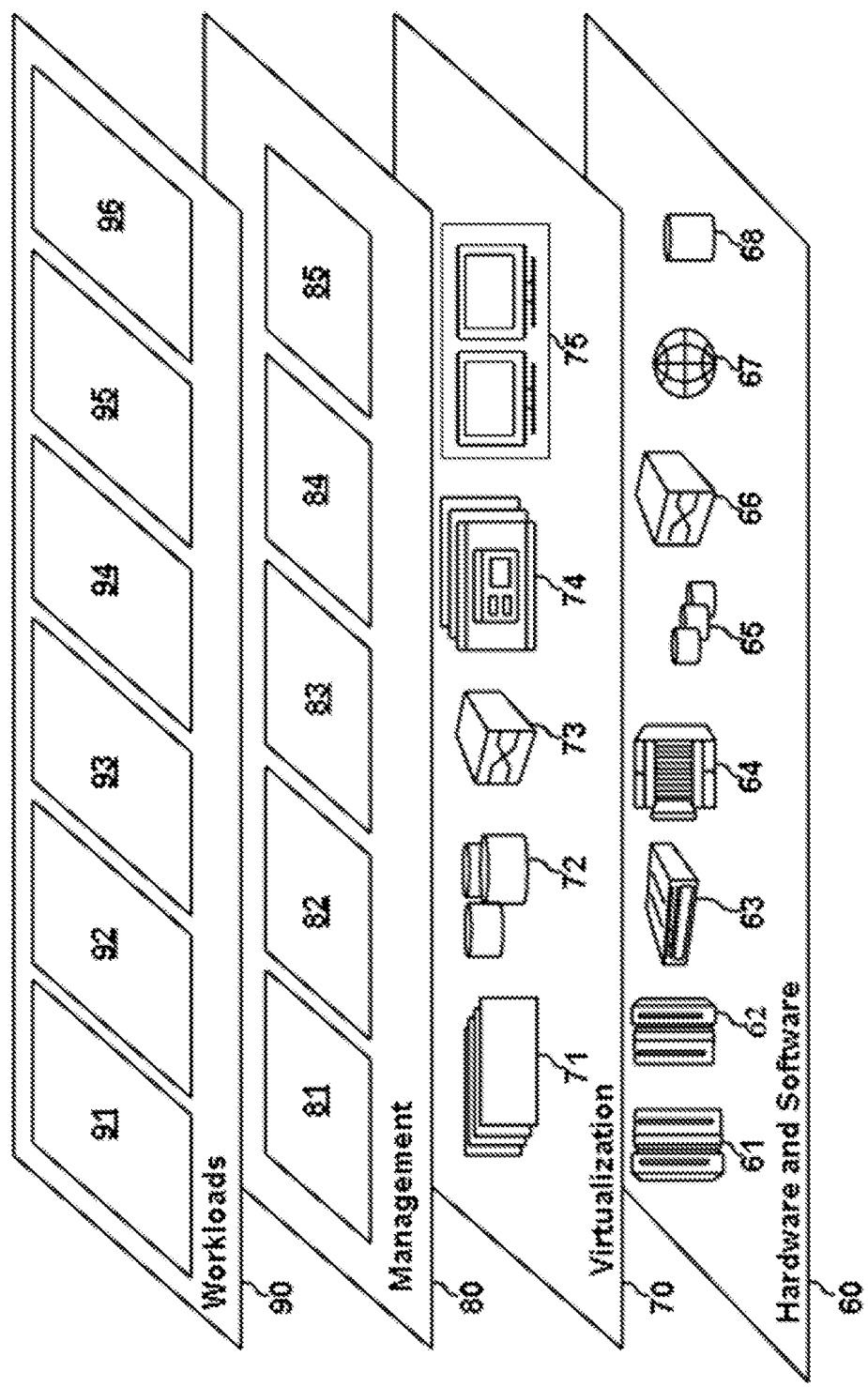
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incident management processes 96 described herein. In accordance with aspects of the invention, the incident management processes 96 workload/function operates to perform one or more of the processes described herein.

Figure 4:
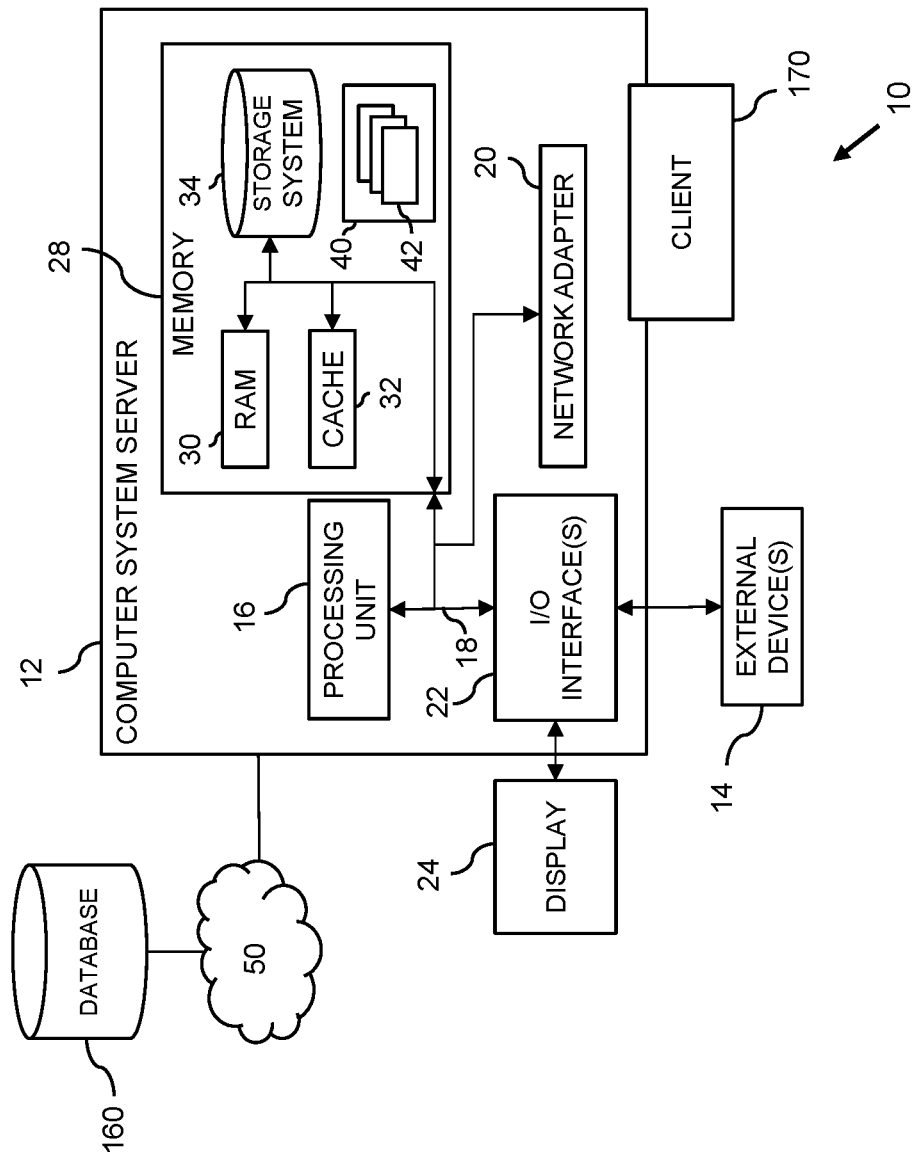
FIG. 4 depicts a cloud computing note according to some embodiments of the present disclosure.

FIG. 4 depicts a cloud computing node according to another embodiment of the present disclosure. In particular, FIG. 4 is another cloud computing node which comprises a same cloud computing node 10 as FIG. 1. In FIG. 4, the computer system/server 12 also comprises or communicates with an incident management client 170, and a database 160.

In accordance with aspects of the invention, the incident management client 170 can be implemented as one or more program code in program modules 42 stored in memory as separate or combined modules. Additionally, the incident management client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the invention.

By way of example, incident management client 170 may be configured to communicate with the database 160 via a cloud computing environment 50. As discussed with reference to FIG. 2, for example, cloud computing environment 50 may be the Internet, a local area network, a wide area network, and/or a wireless network. In embodiments of the proposed incident management mechanism, the database 160 may provision data to the client 170. One of ordinary skill in the art would understand that the incident management client 170 and database 160 may communicate directly. Alternatively, a relay agent may be used as an intermediary to relay messages between incident management client 170 and database 160 via the cloud computing environment 50.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 5 shows an example flow diagram for performing embodiments of the present disclosure. The operations of FIG. 5 may be implemented in the environment of FIGS. 1 and 4, for example. As noted above, the flowchart(s) illustrate the architecture, functionality, and operation of possible implementations of systems, methods, and computer program products as already described herein in accordance with the various embodiments of the present disclosure. The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5A:
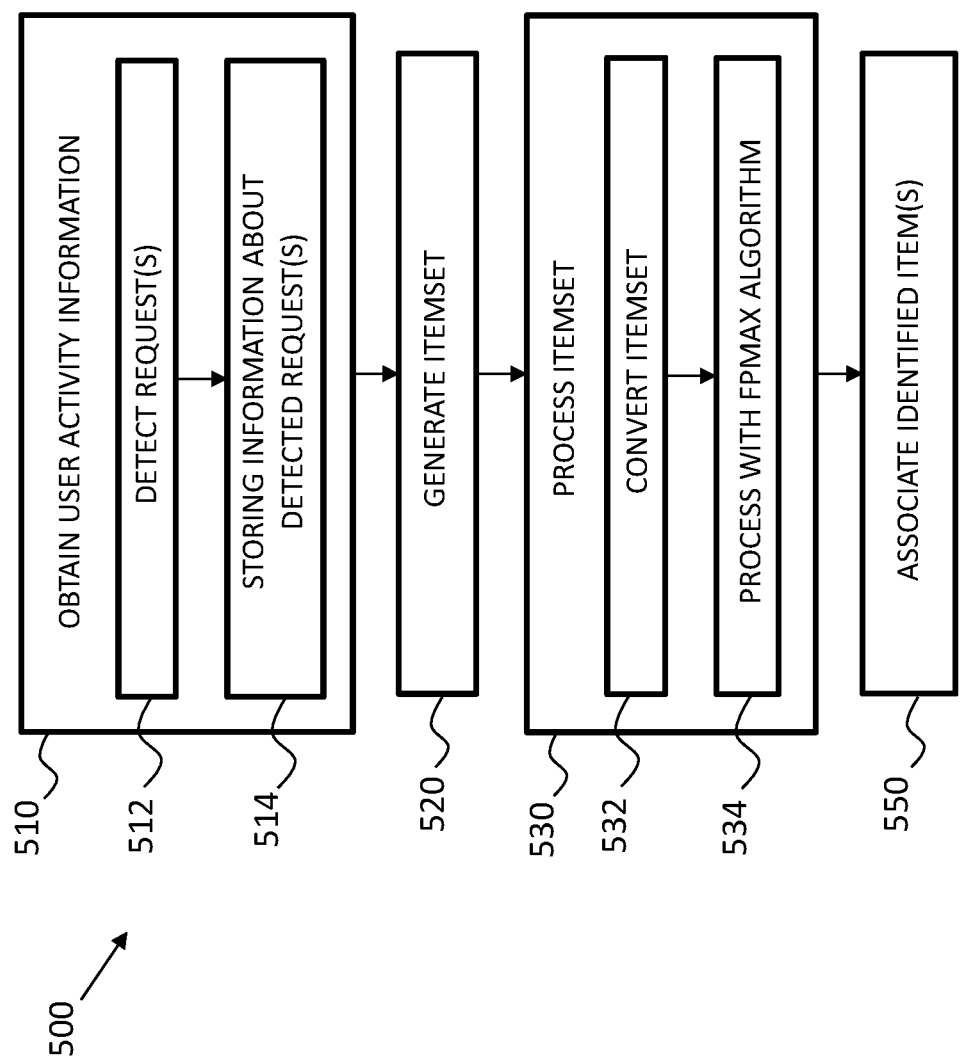
FIG. 5A-5C depict simplified flow diagrams of a computer-implemented method for an operations management system according to embodiments.
Figure 5B:
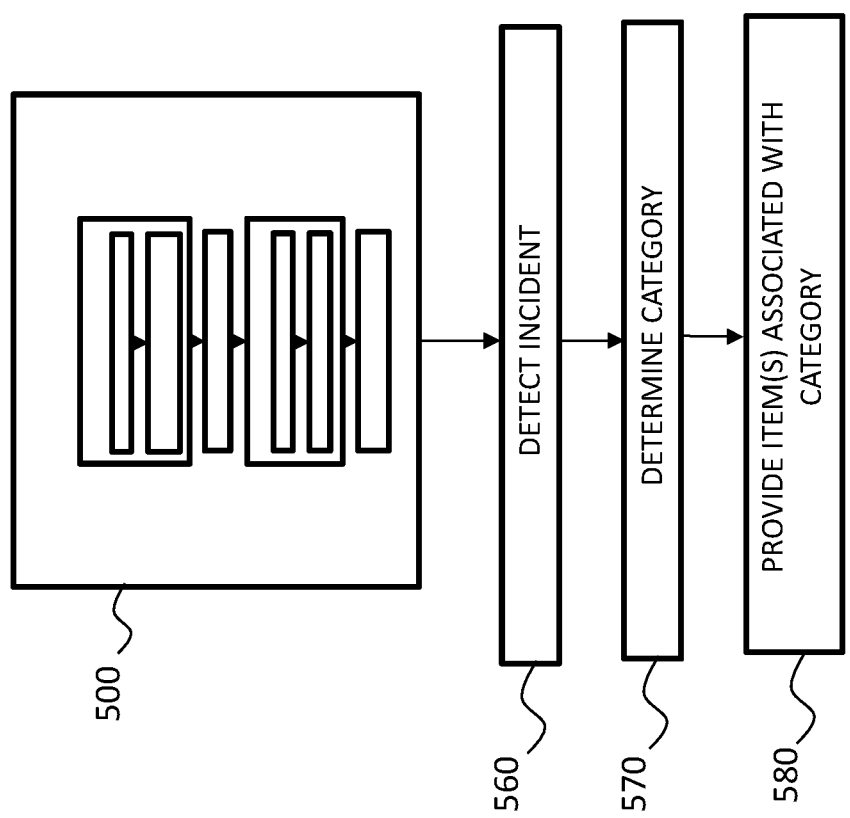
Figure 5C:
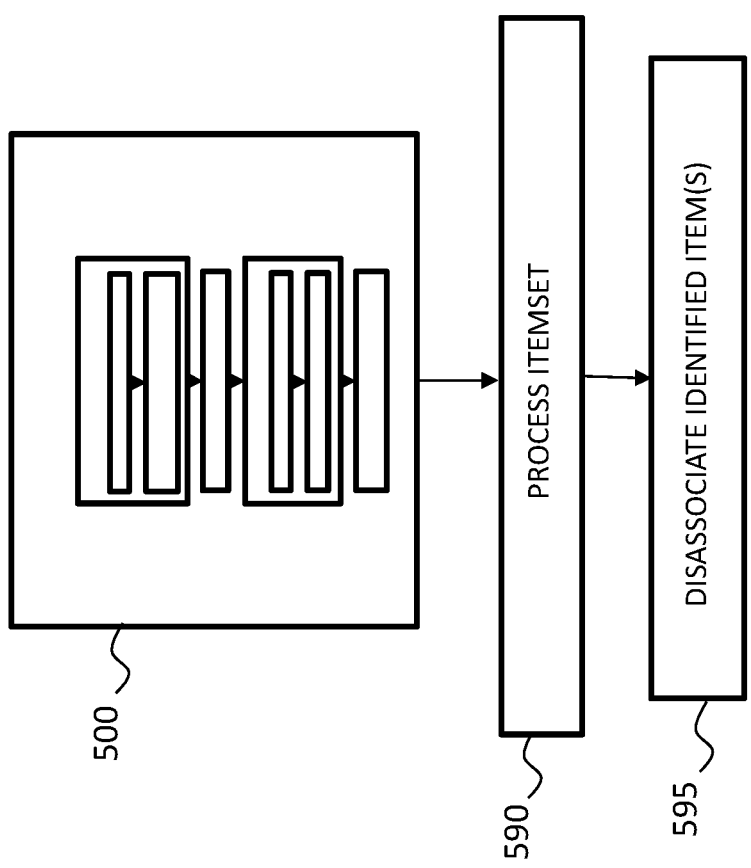

Referring to FIGS. 5A-5C, there are depicted simplified flow diagrams of a computer-implemented method for an operations management system according to embodiments.

Referring first to FIG. 5A, a flow diagram of a computer-implemented method 500 for an operations management system according to embodiment is depicted. The method begins with operation 510 of obtaining user activity information representing user interactions with the operations management system responsive to an incident. The incident has one or more specific characteristics which result in it belonging to a specific category (i.e., type) of incidents. That is, the incident is of a type or nature such that it can be considered to belong to a specific category of incidents, wherein incidents of the same category share specific characteristics/traits in common.

Also, by way of example, the user activity information may comprise at least one of: an identifier of a type of data accessed by the user, an item of data accessed by the user, an identifier of a type of data dismissed or disregarded by the user, an item of data dismissed or disregarded by the user a run book entry, a lookup entry point, a topology search (formed of seed and hop count, or seed and navigation path), a metric anomaly lookup, an event or incident lookup (outside the current incident), a journal lookup, a ticket lookup, chat lookups, and a knowledge page hosted or proxied from the operations management system. In this way, the obtained user activity information relates to one or more aspects of a user's interaction with the operations management system responsive to an incident (e.g., during investigation and/or resolution of the incident).

In particular, in this example embodiment of FIG. 5A, operation 510 of obtaining user activity information comprises two sub-operations 512 and 514. Sub-operation 512 comprises: detecting a request communicated from the user to the operation management system (i.e., user requests are monitored). Sub-operation 514 then comprise storing information about the detected request in a data store (i.e., database) for storing user activity information.

Next, operation 520 comprises representing the user activity information as an itemset. Within the itemset, it may be preferable to provide a method for differentiating different sources for the data, e.g., runbooks vs. topology, runbooks vs. logs, etc.

The itemset (generated in operation 520) is then processed in operation 530. More specifically, operation 530 comprises processing the itemset with a mining algorithm to identify one or more items of information frequently accessed for the incident. Here, operation 530 of processing the itemset comprises sub-operations 532 and 534. Sub-operation 532 comprises converting the itemset to predetermined format to generate a converted itemset (i.e., pre-processing the itemset). Sub-operation 534 then comprises processing the converted itemset with a frequent itemset mining algorithm (or an association rule mining algorithm) such as the FPMAX algorithm. Other algorithms may be employed in different embodiments, such as an apriori algorithm or Equivalence Class Transformation (ECLAT) algorithm, for example.

Operation 550 of the method 500 then comprises associating the identified one or more items of information with the category of incidents. Here, associating the identified one or more items of information with the category of incidents comprises adding the identified one or more items of information to the list associated with the category of incidents. In this way, a list of items of information (i.e., enrichment information) to be provided to a user in response to an incident is built (based on user activity).

FIG. 5B is a flowchart illustrating an extension to the method 500 of FIG. 5A. In particular, FIG. 5B depicts a flow diagram of an embodiment where the method comprises additional operations.

Specifically, the method further comprises the operation 560 of detecting the occurrence of an incident. Responsive to detecting an incident in operation 560, the method then proceeds to the operation 570 determining the category of the detected incident. For instance, one or more characteristics of the incident are determined in operation 570 to determine which category of incidents the incident belongs to, e.g., a signature of the incident is identified. In operation 580, the one or more items of information associated with the category of the incident are provided to the user (e.g., via a user interface or output signal). By way of example, each category of incidents may be associated with an incident signature, the incident signature defining a rule for handling an incident. The operation 580 of providing to a user of the operations management system the one or more items of information associated with the category of incidents may then comprise: providing the one or more item to the user according to the rule defined by the incident signature associated with the category of incidents.

FIG. 5C, depicts an extension to the method 500 of Figure 5AB. In particular, FIG. 5C depicts a flow diagram of an embodiment where the method comprises additional operations.

Specifically, the method of FIG. 5C further comprises the operation 590 of processing the itemset (from method 500 of FIG. 5A) with a mining algorithm to identify a surplus item of information frequently dismissed or disregarded for the incident. Then, in operation 595, the identified surplus item is disassociated with the first category of incidents. In this way, undesired and/or irrelevant information (e.g., frequently dismissed or disregarded by the user) may be determined and automatically withheld from being enriched into the incident.

By way of further example and explanation, an example set of processes involved in an operations management system according to a proposed embodiment is as follows:

(I) Incidents enter the operations management system from probes that monitor one or more real or virtual resources and send incidents about real or synthetic situations relating to that monitored resource.

(II) Other metrics and data sources provide data on similar or related entities that are used by operators in order to solve issues relating to the incidents generated in (I). This, for instance, may include network topology, logs, metrics, etc.

(III) Other tools are configured, such as runbooks, and are available at the operator's disposal.

(IV) A mechanism is provided for escalating tickets/alerts that trigger the generation of the incident within the operations management/incident management system to incidents based on user-created or system-created rules, where incidents are actively part of only one incident at a time. Also, an incident has a method for obtaining a unique signature (e.g., an identifier of one or more characteristics) that is used to denote the mechanism(s) used to promote incidents to the incident. Users (or groups of users) are assigned to incidents or groups/categories/types of incidents.

Purely by way of providing a simplified example, a policy may be defined as follows:

TABLE 1

Policy Definition Example

| | |
|---|---|
| PolicyId: | Policy-01 |
| Name: | Sock Shop |
| Rules: | Incident summary includes "Sock Shop" OR alert group is "Sock Shop" |
| Actions: | Assign to user group A (John, Sally, Fred) |
| IncidentId: | Policy name + time |

The example policy above comprises a set of rules about how to group incidents together. The policy has a unique identifier ("Policy-01") that may be considered a simple signature for an incident. Specifically, the example policy above can generate an incident which follows the following signature (note that two instances of the same incident cannot be open at once):

TABLE 2

Incident Example

| | |
|---|---|
| Signature: | Policy-01 |
| IncidentId: | Sock-Shop Jul. 31, 2020 18.23.25 |
| Assignees: | John, Sally, Fred |
| State: | New |
| Enrichments: | None |
| Events: | <See Table 3> |

TABLE 3

Incident Events Example

| Summary | Alert Group |
|---|---|
| Secret sock-shop-registry-token Expired | Sock Shop |
| Front end container failed to restart | Sock Shop |
| Image pull back off for container front end | Sock Shop |
| 1 of 2 replicas Started | Sock Shop |
| Container Sock Shop SENT v1 schema request when backend server is in schema v2 | Scheme Configuration Monitor |

(VI) As the state of an incident is in progress (i.e., up to being closed), which denotes it is actively being worked on, information about user interactions with incidents and other associated data forms, such as logs, metrics, runbooks, and topology, is gathered, abstracted, stored, and associated with the incident type (e.g., signature).

Figure 6:
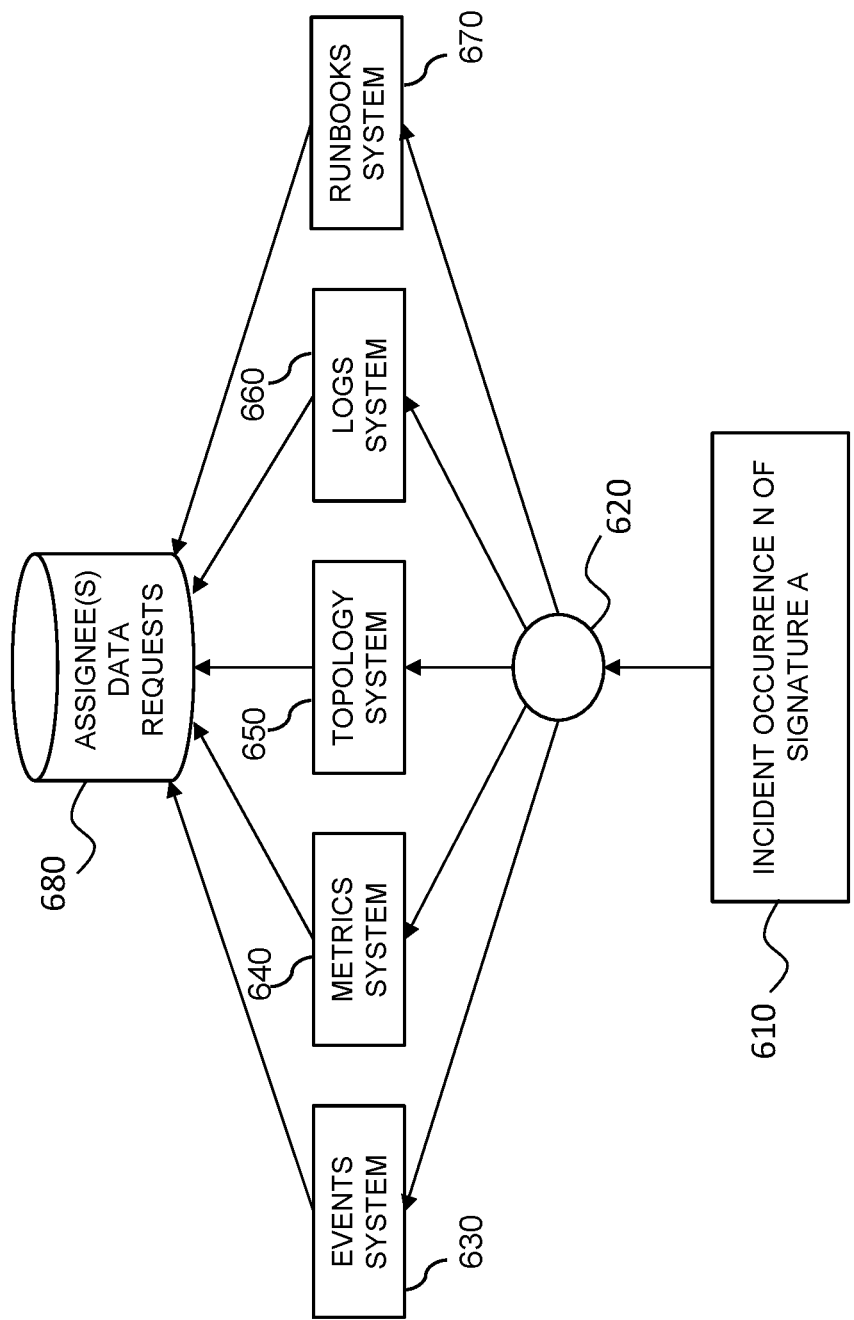
FIG. 6 illustrates an example embodiment wherein a user interacts with various data forms and information about the interaction(s) is monitored and stored according to an embodiment.

FIG. 6 is a block diagram that illustrates an example embodiment where a user interacts with various data forms and information about the interaction(s) is monitored and stored, according to an embodiment.

Responsive to the occurrence of an incident, the user(s) assigned to the incident is informed of the incident. The user interacts with various systems via one or more requests to the systems. In the depicted example of FIG. 6, the user interacts with an Events System 630, a Metrics System 640, a Topology System 650, a Logs System 660, and a Runbooks System 670. An incident occurrence N of signature A 610 is distributed 620 to these systems 630-670 for handling.

Records of these interactions (e.g., transactions), including identifiers or lookup entry points, are obtained and stored in a database 680. The database 680 thus stores information about the assignee(s) data requests.

In this way, request entry data is stored for each of the systems the user interacts with, for the duration of incident occurrence N of incident with signature A 610.

Below is a data structure demonstrating a possible example embodiment of the format of data collected from the diagram shown above. Note that one inner array represents one incident occurrence. For each new incident, a new inner array is added. If the new array exceeds the size of N, then the first item of the array is removed before persisting. In the example below, in the format letter-ID, the letter denotes the type of media requested, where t=topology, l=logs, m=metrics and r could be runbooks. The data is not intentionally ordered in any format.

```
userInteractions[Policy-01] =[
['t1', '18', 'm23', 'e23', 'e513', 'e923'],
['t1', '18', 'm23', 'e23', 'e513', 'e923'],
['e28', '18', 'm23'],
['e2939', '18', 'e23', 'e513', 'e923'],
['t1', 't1', '18', 'e9', 'm23']
]
```

(VII) Frequent itemset mining methods such are applied to an incident each time an incident is closed, to identify the data forms (i.e., items of information) frequently used during the resolution of the incident. The identified data forms are stored and associated with the incident type (e.g., the incident signature) so that it can be used as enrichment data for a future occurrence of an incident of the same type (i.e., an incident matching the incident signature of the data).

The data is prepared for processing in frequency processors, so that the data is translated to the following format. This pre-processing method is pure Boolean one hot encoding, in this case, of userInteractions[Policy-01]:

TABLE 4

Data Prepared for Frequency Processing Example

| | e23 | e28 | e2939 | e513 | e9 | e923 | 18 | m23 | t1 |
|---|---|---|---|---|---|---|---|---|---|
| 0 | True | False | False | True | False | True | True | True | True |
| 1 | True | False | False | True | False | True | True | True | True |
| 2 | False | True | False | False | False | False | True | True | False |
| 3 | True | False | True | True | False | True | True | False | False |
| 4 | False | False | False | False | True | False | True | True | True |

Below are example embodiments of frequency mining outputs where support is configured at 0.8, although any value could be used. However, for the rest of this example embodiment, the FPMAX algorithm will be used (shown last) due to its desirable properties:

TABLE 5

FPGrowth Algorithm Output

| | Support | Itemsets |
|---|---|---|
| 0 | 1.0 | (18) |
| 1 | 0.8 | (m23) |
| 2 | 0.8 | (18, m23) |

TABLE 6

Apriori Algorithm Output

| | Support | Itemsets |
|---|---|---|
| 0 | 1.0 | (18) |
| 1 | 0.8 | (m23) |
| 2 | 0.8 | (18, m23) |

TABLE 7

FPMAX Algorithm Output

| | Support | Itemsets |
|---|---|---|
| 0 | 0.8 | (18, m23) |

TABLE 8

Selected itemsets

| | Support | Itemsets |
|---|---|---|
| 0 | 0.8 | (18, m23) |

Once the results have been captured from the output of FPMAX, there is one final stage of processing before enriching those frequent associations mined into the policy. This decomposes any rules generated into a consolidated and deduplicated flat format. FPMAXitemset(s) can be considered to comprise the results from the FPMAX process as shown above.

For itemset in fpmaxItemset(s):
For item in itemset:
If item not in deduplicatedItemset:
deduplicatedItemset.append(item)

Entities (['18', 'm23']), are thus added into a table under the incident signature (Policy-01). The method used here an additive merge, and not replace. Now, when an incident instance of this signature is loaded, these items are loaded into the user interface as enrichment items of data. They may optionally be enriched into the incident instance.

(VIII) Once data forms are identified once for an incident type, their association with the incident type is maintained (i.e., the association is persistent) so that they are always, in some embodiments, used as enrichment information for subsequent occurrences of the incidents of the same type. To determine whether data forms presented and enriched for an incident should be removed (i.e., no longer provided), user actions dismissing the data form(s) are monitored and used to generate an exclusion list. Generation of the exclusion list may also implement a method of frequent itemset mining to determine that one or more forms of enrichment data should be removed (i.e., disassociated with the incident type). That is, forms of enrichment data commonly dismissed from an incident are subtracted for the list of enrichment data for an incident type.

If items are not frequently dismissed, they grow organically based on the results of frequent itemset mining based on user searches as identified in operation (VII) above.

The below snippet of example code assumes evolution of incident scope background, which may otherwise be problematic as the same resources that were previously included may no longer be relevant. For example, consider the original system interaction item sets considered above:

```
userInteractions[Policy-01] =[
['t1'      '18'     'm23'    'e23'    'e513'   'e923']
['t1'      '18'     'm23'    'e23'    'e513'   'e923']
['e28'     '18'     'm23']
['e2939'   '18'     'e23'    'e513'   'e923']
['t1'      't1'     '18'     'e9'     'm23']
```

For the next set of five system interactions, the search entities change due to underlying changes in the incident space. An example of this would be a Kubernetes workload moving to a new Kubernetes cluster. As a result, it can be seen that the user searches are now different:

TABLE 9

User Searches

| | e28 | e89 | e9 | e90 | e91 | 12m99 | 13 | 18 | m23 | m99 | t1 |
|---|---|---|---|---|---|---|---|---|---|---|---|
| 0 | False | True | False | True | True | False | False | True | False | True | False |
| 1 | False | True | False | True | True | False | True | False | False | True | True |
| 2 | True | False | False | False | False | True | True | True | False | False | False |
| 3 | False | True | False | True | False | False | False | True | False | False | False |
| 4 | False | True | True | False | False | False | False | True | True | False | False |

The result set is then different:

TABLE 10

FPGrowth Algorithm Outlook

| | Support | Itemsets |
|---|---|---|
| 0 | 1.0 | (18) |
| 1 | 0.8 | (e89) |

TABLE 11

Apriori Algorithm Outlook

| | Support | Itemsets |
|---|---|---|
| 0 | 0.8 | (e89) |
| 1 | 0.8 | (18) |

TABLE 12

FPMAX Algorithm Outlook

| | Support | Itemsets |
|---|---|---|
| 0 | 0.8 | (e89) |
| 1 | 0.8 | (18) |

The combined output of both results yields {18, m23, e89}. However, from recent search history it is identified that that m23 may no longer be relevant (due to its decline in searches). However, this assumption cannot necessarily be made. Once a user is presented with something, it eliminates the need to search it. It may therefore be preferable to use user dismissal actions in order to determine whether m23 is still relevant.

Taking the set of user dismissals in the last five transactions:

```
userDismissals = [
['m23'],
['m23'],
['m23'],
[ ],
[ ]
]
```

That is:

TABLE 13

Determination of Relevance

| | m23 |
|---|---|
| 0 | True |
| 1 | True |
| 2 | True |
| 3 | False |
| 4 | False |

The support in this instance is not over a threshold of T (0.8) for deletion. However, if this changes over transactions as follows:

```
userDismissals = [
    ['m23'],
    ['m23'],
    ['m23'],
    ['m23'],
    ['m23']
],
```

It can then be seen the support threshold T (0.8) is surpassed and thus it is used in a set subtraction from the full set of enrichments to make:

TABLE 14

| Determination of Relevance | |
| --- | --- |
| | m23 |
| 0 | True |
| 1 | True |
| 2 | True |
| 3 | True |
| 4 | True |

The result set is then:

TABLE 15

| FPGrowth Algorithm Outlook | | |
| --- | --- | --- |
| | Support | Itemsets |
| 0 | 1.0 | (m23) |

TABLE 16

| Apriori Algorithm Outlook | | |
| --- | --- | --- |
| | Support | Itemsets |
| 0 | 1.0 | (m23) |

TABLE 17

| FPMAX Algorithm Outlook | | |
| --- | --- | --- |
| | Support | Itemsets |
| 0 | 1.0 | (m23) |

Thus, on the next incident occurrence, the list of enrichments will become:

{18, m23, e89} subtract {m23} . . . {18, e89}.

In this way, only the relevant enrichments are made based on the user support thresholds. The user removal thresholds may be regenerated at each execution cycle, meaning they do not aggregate over execution cycles.

In some embodiments, an additional metric can be captured to generate an optimization problem, where only user interaction item sets pertaining to a range of values for the incident time to resolve are considered, for example, the lower quartile, so that only the best enrichments are considered.

The resulting output from the described process(es) above is that incidents automatically get enriched with materials (i.e., enrichment data) that has been identified based on previous user activities undertaken during the investigation workflow of one or more incidents of the same type.

In embodiments of the present disclosure, the ARM mechanism provides numerous advantages over conventional data mining approaches. These advantages include, but are not limited to, efficient consumption of dynamic data in a stable way and without the need to rescan entire data. In embodiments of the present disclosure, this technical solution is accomplished by using in-memory rolling filtering bitmaps over dynamic data.

In still further advantages to a technical problem, the systems and processes described herein provide a computer-implemented method for efficient ARM with respect to multilevel knowledge-based transactional databases, and such databases may be provided on (or via) on a distributed communication network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for an operations management system, the method comprising:

obtaining user activity information representing user interactions with the operations management system responsive to an information technology system operational incident, the incident belonging to a category of incidents;

processing the user activity information as an itemset using a pure Boolean one-hot encoding operation;

collecting dismissive information indicative of information dismissal associated with a user dismissal of log data, topology data, metrics data, and runbook entries, wherein the collecting of dismissive information is selected from the group consisting of: eye tracking, and gaze detection, wherein, based on the dismissive information, undesired and/or irrelevant information is automatically prevented from being supplied to the user in response to a subsequent occurrence of a future incident of a same or similar type, category, or nature of the incident;

processing the itemset with a mining algorithm to identify:
one or more items of information frequently accessed for the incident; and
a surplus item of information frequently disregarded for the incident using the dismissive information;
disassociating of the surplus item of information with the category of incidents to modify the category of incidents;
associating the identified one or more items of information frequently accessed for the incident with the category of incidents to further modify the category of incidents;
providing the further modified category of incidents to mitigate a subsequent information technology system operational incident; and
outputting the further modified category of incidents to a user via a user interface;
wherein the user activity information includes: browsing and exploring log data, topology data, metrics data, and runbook entries pertaining to an incident.

2. The method of claim 1, further comprising:
responsive to the occurrence of an incident belonging to the category of incidents, providing, to a user of the operations management system, the one or more items of information associated with the category of incidents.

3. The method of claim 2, wherein the category of incidents is associated with an incident signature, the incident signature defining a rule for handling an incident, and wherein the operation of providing, to a user of the operations management system, the one or more items of information associated with the category of incidents comprises:
providing the one or more item to the user according to the rule defined by the incident signature associated with the category of incidents.

4. The method of claim 1, wherein obtaining user activity information comprises:
detecting a request communicated from the user to the operation management system; and
storing information about the detected request in a data store for storing user activity information.

5. The method of claim 1, wherein processing the itemset with a mining algorithm comprises:
converting the itemset to a predetermined format to generate a converted itemset; and
processing the converted itemset with a frequent itemset or association rule mining algorithm.

6. The method of claim 1, wherein associating the identified one or more items of information with the category of incidents comprises:
adding the identified one or more items of information to list associated with the category of incidents.

7. A method implemented in a computer infrastructure having computer executable code tangibly embodied on a computer readable storage medium having programming instructions tangibly embodied thereon, the programming instructions configured to, when executed on a processor:
obtain user activity information representing user interactions with an operations management system responsive to an information technology system operational incident, the incident belonging to a category of incidents;
process the user activity information as an itemset using a pure Boolean one-hot encoding operation;
collect information indicative of information dismissal associated with a user dismissal of log data, topology data, metrics data, and runbook entries, wherein the collecting of dismissive information is selected from the group consisting of: eye tracking, and gaze detection, wherein, based on the dismissive information, undesired and/or irrelevant information is automatically prevented from being supplied to the user in response to a subsequent occurrence of a future incident of a same or similar type, category, or nature of the incident;
process the itemset with a mining algorithm to identify:
one or more items of information frequently accessed for the incident; and
a surplus item of information frequently disregarded for the incident;
disassociate of the surplus item of information with the category of incidents to modify the category of incidents;
associate the identified one or more items of information frequently accessed for the incident with the category of incidents to further modify the category of incidents;
provide the further modified category of incidents to mitigate a subsequent information technology system operational incident; and
outputting the further modified category of incidents to a user via a user interface;
wherein the user activity information includes: browsing and exploring log data, topology data, metrics data, and runbook entries pertaining to an incident.

8. A computer program product for an operations management system, the computer program product comprising a computer readable storage medium having program instructions embodied therewith, the program instructions executable by a processing unit to cause the processing unit to perform a method comprising:
obtaining user activity information representing user interactions with the operations management system responsive to an information technology system operational incident, the incident belonging to a category of incidents;
processing the user activity information as an itemset using a pure Boolean one-hot encoding operation;
collecting dismissive information indicative of information dismissal associated with a user dismissal of log data, topology data, metrics data, and runbook entries, wherein the collecting of dismissive information is selected from the group consisting of: eye tracking, and gaze detection, wherein, based on the dismissive information, undesired and/or irrelevant information is automatically prevented from being supplied to the user in response to a subsequent occurrence of a future incident of a same or similar type, category, or nature of the incident;
processing the itemset with a mining algorithm to identify:
one or more items of information frequently accessed for the incident; and
a surplus item of information frequently disregarded for the incident using the dismissive information;
disassociating of the surplus item of information with the category of incidents to modify the category of incidents;
associating the identified one or more items of information frequently accessed for the incident with the category of incidents to further modify the category of incidents;

providing the further modified category of incidents to mitigate a subsequent information technology system operational incident; and outputting the further modified category of incidents to a user via a user interface;

wherein the user activity information includes: browsing and exploring log data, topology data, metrics data, and runbook entries pertaining to an incident.

9. A processing system comprising at least one processor and the computer program product of claim 8, wherein the at least one processor is adapted to execute the computer program code of said computer program product.

10. An incident management system for an operations management system, the incident management system comprising:

a processor arrangement configured to perform the operations of:

obtaining user activity information representing user interactions with the operations management system responsive to an information technology system operational incident, the incident belonging to a category of incidents;

processing the user activity information as an itemset using a pure Boolean one-hot encoding operation;

collecting dismissive information indicative of information dismissal associated with a user dismissal of log data, topology data, metrics data, and runbook entries, wherein the collecting of dismissive information is selected from the group consisting of: eye tracking, and gaze detection, wherein, based on the dismissive information, undesired and/or irrelevant information is automatically prevented from being supplied to the user in response to a subsequent occurrence of a future incident of a same or similar type, category, or nature of the incident;

processing the itemset with a mining algorithm to identify:

one or more items of information frequently accessed for the incident; and a surplus item of information frequently disregarded for the incident using the dismissive information;

disassociating of the surplus item of information with the category of incidents to modify the category of incidents;

associating the identified one or more items of information frequently accessed for the incident with the category of incidents to further modify the category of incidents;

providing the further modified category of incidents to mitigate a subsequent information technology system operational incident; and outputting the further modified category of incidents to a user via a user interface;

wherein the user activity information includes: browsing and exploring log data, topology data, metrics data, and runbook entries pertaining to an incident.

11. The system of claim 10, wherein the processor arrangement is further configured to perform the operations of:

responsive to the occurrence of an incident belonging to the category of incidents, providing, to a user of the operations management system, the one or more items of information associated with the category of incidents.

12. The system of claim 11, wherein:

the category of incidents is associated with an incident signature, the incident signature defining a rule for handling an incident;

the operation of providing, to a user of the operations management system, the one or more items of information associated with the category of incidents comprises providing the one or more item to the user according to the rule defined by the incident signature associated with the category of incidents.

13. The system of claim 12, wherein obtaining user activity information comprises:

detecting a request communicated from the user to the operation management system; and storing information about the detected request in a data store for storing user activity information.

14. The system of claim 10, wherein processing the itemset with a mining algorithm comprises:

converting the itemset to predetermined format to generate a converted itemset; and processing the converted itemset with a frequent itemset or association rule mining algorithm.

15. The system of claim 10, wherein associating the identified one or more items of information with the category of incidents comprises:

adding the identified one or more items of information to list associated with the category of incidents.

* * * * *